(12) United States Patent
Pedersen et al.

(10) Patent No.: US 9,952,913 B2
(45) Date of Patent: *Apr. 24, 2018

(54) CENTRALIZED PERIPHERAL ACCESS PROTECTION

(71) Applicant: Atmel Corporation, San Jose, CA (US)

(72) Inventors: Frode Milch Pedersen, Trondheim (NO); Sebastien Jouin, La Chapelle-Launay (FR); Stein Danielsen, Flatasen (NO); Francois Fosse, Nantes (FR); Thierry Delalande, Nantes (FR); Ivar Holand, Trondheim (NO); James Hallman, Raleigh, NC (US)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,198

(22) Filed: Jan. 23, 2017

(65) Prior Publication Data

US 2017/0132051 A1 May 11, 2017

Related U.S. Application Data

(63) Continuation of application No. 13/965,020, filed on Aug. 12, 2013, now Pat. No. 9,552,385.

(51) Int. Cl.
| | |
|---|---|
| *G06F 13/362* | (2006.01) |
| *G06F 17/30* | (2006.01) |
| *G06F 13/40* | (2006.01) |
| *G06F 13/12* | (2006.01) |
| *G06F 9/52* | (2006.01) |
| *G06F 13/28* | (2006.01) |
| *G06F 13/42* | (2006.01) |

(52) U.S. Cl.
CPC .............. *G06F 9/526* (2013.01); *G06F 13/28* (2013.01); *G06F 13/362* (2013.01); *G06F 13/4282* (2013.01); *G06F 17/30362* (2013.01)

(58) Field of Classification Search
CPC ...... G06F 13/28; G06F 13/4282; G06F 9/526; G06F 17/30362; G06F 13/362; G06F 13/4004; G06F 11/00
USPC ........................................................ 710/200
See application file for complete search history.

(56) References Cited

U.S. PATENT DOCUMENTS

| | | |
|---|---|---|
| 5,887,194 A | 3/1999 | Carson |
| 6,223,223 B1 | 4/2001 | Kumpf |
| 6,463,540 B1 | 10/2002 | Lelong |
| 6,466,982 B1 | 10/2002 | Ruberg |
| 7,953,913 B2 | 5/2011 | Perry |
| 9,552,385 B2 | 1/2017 | Pedersen et al. |
| 2009/0119785 A1 | 5/2009 | Challener et al. |

*Primary Examiner* — Glenn A Auve
(74) *Attorney, Agent, or Firm* — Fish & Richardson P.C.

(57) ABSTRACT

Implementations are disclosed for a centralized peripheral access controller (PAC) that is configured to protect one or more peripheral components in a system. In some implementations, the PAC stores data that can be set or cleared by software. The data corresponds to an output signal of the PAC that is routed to a corresponding peripheral component. When the data indicates that the peripheral is "unlocked" the PAC will allow write transfers to registers in the peripheral component. When the data indicates that the peripheral component is "locked" the PAC will refuse write transfers to registers in the peripheral component and terminate with an error.

24 Claims, 2 Drawing Sheets

CENTRALIZED PERIPHERAL ACCESS PROTECTION

CLAIM OF PRIORITY

This application is a continuation of and claims priority under 35 USC § 119(e) to U.S. patent application Ser. No. 13/965,020, filed on Aug. 12, 2013, the entire contents of which are hereby incorporated by reference.

TECHNICAL FIELD

This disclosure relates generally to accessing peripherals in a microcontroller system.

BACKGROUND

Software executing by a microcontroller can become unstable due to software bugs or running the microcontroller in environmental conditions outside a specified range (e.g., under voltage, clock spikes). Microcontrollers are used in embedded applications, where equipment can be stuck or permanently damaged (e.g. motors, halogen bulbs), if such malfunctioning software unintentionally writes to peripheral registers that control critical functions in the application. The two common failure types are runaway code, such as jumping to the wrong location in the program memory and a loose pointer which points to a wrong address in a data memory space.

Protection against unintended register modification has traditionally been handled locally within each peripheral component by some form of lock mechanism. For example, the need to write a key register to unlock access to another register. The exact mechanism is often specific to each peripheral component. The driver code for the peripheral component becomes more inefficient and complex because it needs to handle the unlocking. Typically, the driver will unlock the peripheral register immediately before modifying its contents, so inadvertent jumps to the driver code (runaway code) could result in writing a random value to the peripheral register. Sometimes only system-critical registers are protected to avoid over-complicating the driver. This solution leaves many registers and peripheral components without access protection. This is unfortunate since difference features can be critical in different systems. For example, a random write to a general purpose I/O (GPIO) port register can be fatal in one system but not in another, so it is normally not protected.

SUMMARY

Implementations are disclosed for a centralized peripheral access controller (PAC) that is configured to protect one or more peripheral components in a system. In some implementations, the PAC stores data that can be set or cleared by software. The data corresponds to an output signal of the PAC that is routed to a corresponding peripheral component. When the data indicates that the peripheral is "unlocked" the PAC will allow write transfers to registers in the peripheral component. When the data indicates that the peripheral component is "locked" the PAC will refuse write transfers to registers in the peripheral component and terminate with an error.

In some implementations, the peripheral components can make exceptions to make the protection scheme more practical. For example, a locked peripheral component can allow write transfers in a debug mode when the central processing unit (CPU) is stopped, as the write transfer is known to be an intentional access from a debugger. Additionally, registers subject to direct memory access (DMA) can be exempted from write protection, as a DMA controller cannot easily unlock peripheral components to access data.

In some implementations, the PAC will not allow locking of a locked module, or unlocking of an unlocked module, as this illogical operation could be a symptom of runaway code or software bugs. An attempt to do so will result in an error being generated (e.g., a bus error or interrupt).

In some implementations, a system comprises: one or more peripheral components; a centralized peripheral access controller; and a bus coupling together the centralized peripheral access controller and the one or more peripheral components, where the centralized peripheral access controller is configured to: determine whether data associated with a peripheral component indicates that access to the peripheral component is locked or unlocked; and allow access to the peripheral component if the data indicates that access is unlocked and deny access to the peripheral component if the data indicates that access is locked.

In some implementations, a method comprises: receiving, at a centralized peripheral controller in an integrated circuit (IC), a request to access a peripheral component; determining whether data associated with the peripheral component indicates that access is locked or unlocked; and allowing access to the peripheral component if the data indicates that access to the peripheral component is unlocked and denying access to the peripheral component if the data indicates that access to the peripheral component is locked.

Other implementations are directed to methods, circuits, systems and computer-readable mediums.

Particular implementations disclosed herein provide one or more of the following advantages: 1) peripheral components and registers can be protected by a centralized locking mechanism without added cost to the peripheral components; 2) an application can select which features to protect, instead of this choice being made locally in each peripheral component; and 3) significant improvement for peripheral component drivers in the form of more compact and less complex driver code.

DETAILED DESCRIPTION

Figure 1:
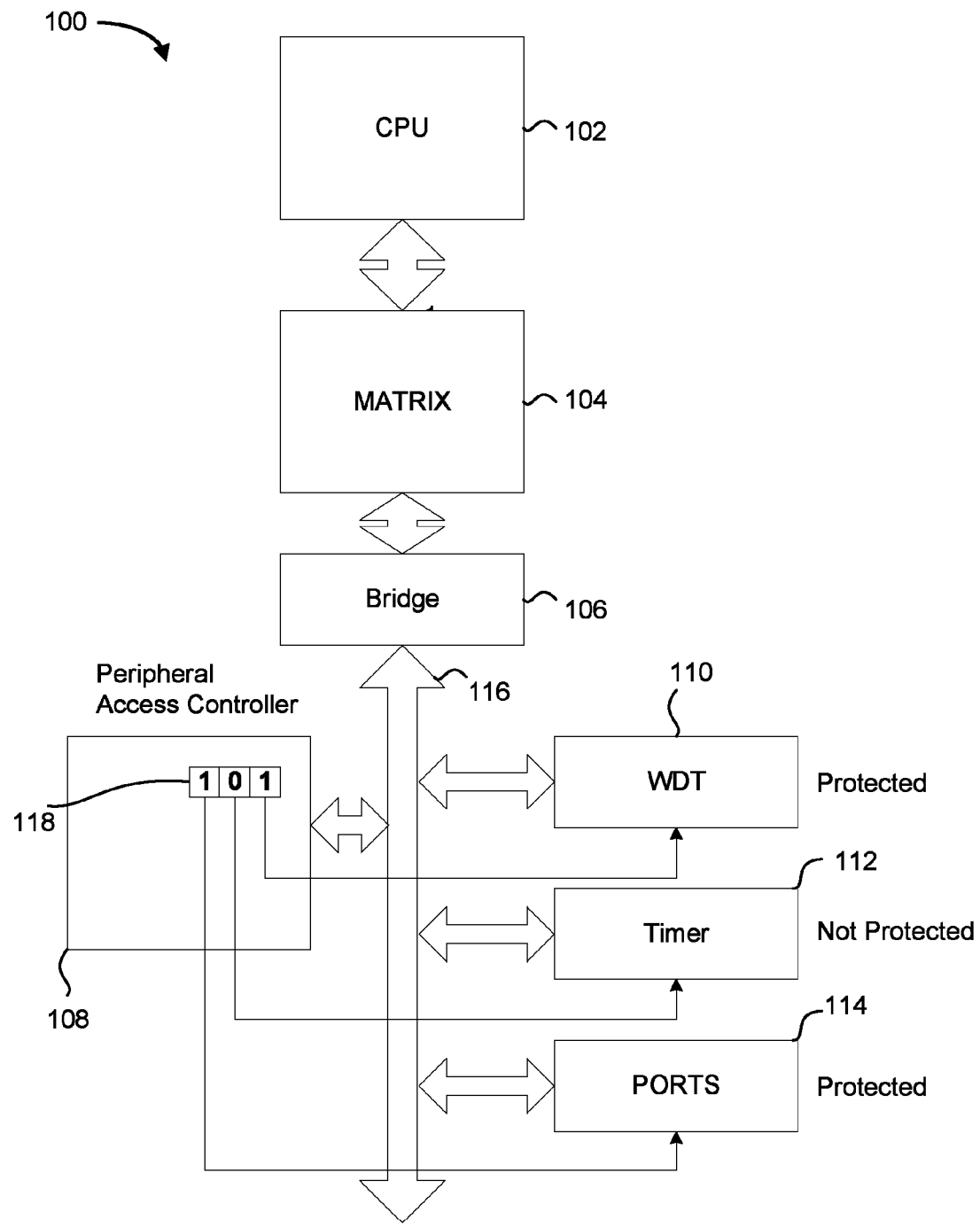
FIG. 1 is a conceptual diagram of an example circuit that includes a centralized peripheral access controller.

FIG. 1 is a conceptual diagram of an example circuit 100 that includes a centralized peripheral access controller. In some implementations, circuit 100 can include CPU 102, matrix 104, bridge 106, PAC 108, Watch Dog Timer (WDT) module 110, timer module 112 and ports module 114. Bus 116 (e.g., APB) couples peripheral components 110, 112, 114 to bus bridge 106. Bridge 106 is coupled to bus matrix 104 and bus matrix 104 is coupled to CPU 102.

Bus bridge 106 (e.g., APB bridge) provides an interface between a high-speed bus domain and a low-power bus domain (e.g., bus 116). Read and write transfers on the high-speed bus are converted into corresponding transfers on bus 116 through a master interface. Because bus 116 is not pipelined, wait states are added during transfers to and from bus 116 when the high-speed bus is required to wait for the peripheral bus protocol.

Matrix 104 (e.g., AHB Matrix) is used in multi-layer systems. Matrix 104 enables multiple masters from different buses to be coupled to multiple slaves on multiple buses. It enables parallel access to a number of shared slaves from a number of different masters. Matrix 104 determines the master that gains access to each slave, and routes the control signals and data signals between them.

PAC 108 is configured to protect one or more peripheral components 110, 112, 114. In some implementations, PAC 108 stores data (e.g., one or bits per peripheral component) in register 118, which can be set or cleared by software running in PAC 18. The data corresponds to an output signal of PAC 108 module that is routed to a corresponding peripheral component 110, 112, 114. When the data indicates that the peripheral component is "unlocked" PAC 108 allows write transfers to registers in the peripheral component. When the data indicates that the peripheral component is "locked" PAC 108 will refuse write transfers to any register in the peripheral component and terminate the transfer with an error (e.g., a bus error or interrupt). In the example shown, register 118 contents includes the bits 101, corresponding to peripheral components, 114, 112 and 110. Assuming that "1" is locked and "0" is unlocked peripheral component 110 is locked (protected), peripheral component 112 is not locked (not protected) and peripheral component 114 is locked (protected).

In some implementations, peripheral components 110, 12, 114 can make exceptions to make the protection scheme more practical. For example, a locked peripheral component can allow any write operation in a debug mode when the central processing unit (CPU) is stopped, as it is known to be an intentional access from the debugger. Additionally, registers subject to direct memory access (DMA) can be exempted from write protection, as a DMA controller (not shown) cannot easily unlock peripheral components to access data.

In some implementations, PAC 108 will not allow locking of a locked peripheral component, or unlocking of an unlocked peripheral component, as this illogical operation could be a symptom of runaway code or software bugs. An attempt to do so will result in an error being generated (e.g., a bus error or interrupt).

Figure 2:
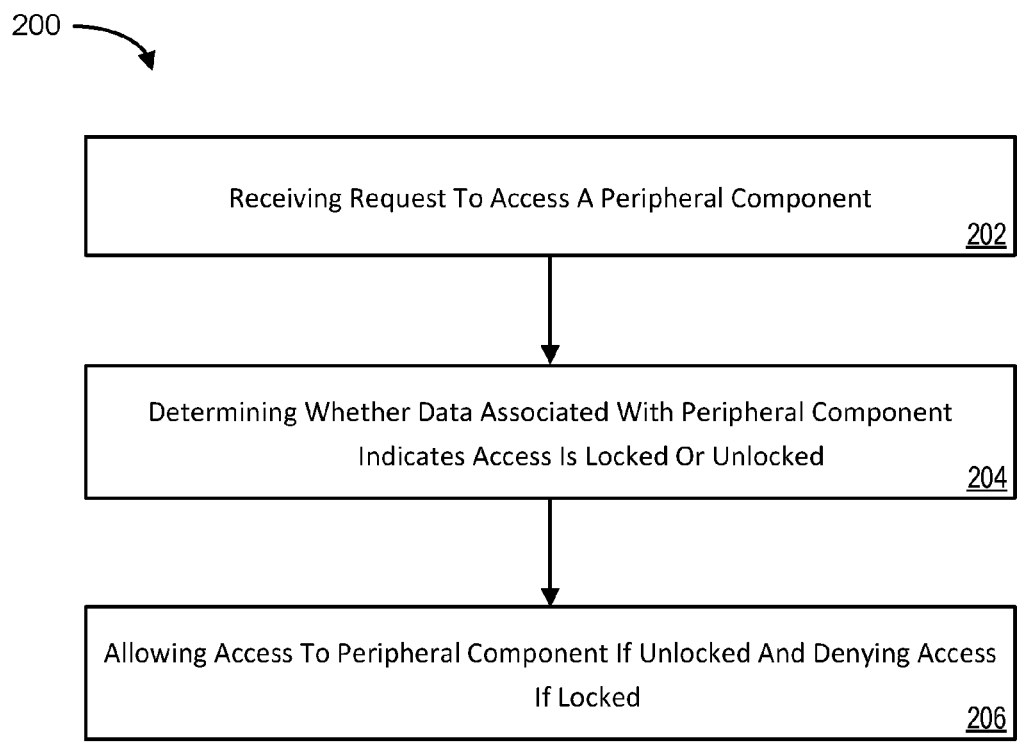
FIG. 2 is a flow diagram of an example process performed by the centralized peripheral access controller of FIG. 1.

FIG. 2 is a flow diagram of an example process 200 performed by PAC 108 shown in FIG. 1. In some implementations, process 200 can begin by receiving a request to access a peripheral component (202). Process 200 can continue by determining whether data associated with the peripheral component indicates that access is locked or unlocked (204). The data can be bits stored in a register in the PAC. Process 200 can continue by allowing access to the peripheral component if the data indicates that access to the peripheral component is unlocked and denying access to the peripheral component if the data indicates that access to the peripheral component is locked (206). The PAC can provide output signals that are routed to corresponding peripheral components. For example, if a peripheral component is unlocked, the output signal coupled to the peripheral component is driven LOW, and if a peripheral component is locked, the output signal coupled to the peripheral component is driven HIGH.

In some implementations, data can be one or more bits and one or more output signals can be coupled to the peripheral component. For example, each register in a peripheral component can be coupled to a designated output signal of the PAC so that multiple registers within a single peripheral component can be individually locked or unlocked by the PAC. In some implementation, bits can be serially transferred to the peripheral component over a single output line coupled to the peripheral component, and the bits can be used locally by the peripheral component to lock or unlock individual registers.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A microcontroller device comprising:
one or more peripheral components;
a peripheral access controller that is coupled to the one or more peripheral components and includes data that indicate lock statuses of the one or more peripheral components, the peripheral access controller configured to:
receive a request to access a particular peripheral component of the one or more peripheral components;
in response to the request, read a value of the data associated with the particular peripheral component;
based on reading the value of the data associated with the particular peripheral component, determine a lock status of the particular peripheral component;
conditioned on determining that the particular peripheral component is unlocked, allow access to the particular peripheral component; and
conditioned on determining that the particular peripheral component is locked, deny access to the particular peripheral component.

2. The microcontroller device of claim 1, wherein the data that indicate lock statuses of the one or more peripheral components correspond to values of bits in a register included peripheral access controller.

3. The microcontroller device of claim 2, wherein each bit in the register corresponds to a different peripheral component and indicates a lock status of the corresponding peripheral component.

4. The microcontroller device of claim 2, wherein software executed in the peripheral access controller is configured to set or clear the values of the bits in the register.

5. The microcontroller device of claim 1, where the peripheral access controller is configured to:
receive a request for at least one of a write operation in a debug mode to the particular peripheral component, or direct memory access (DMA) to the particular peripheral component; and
in response to the request, allow the write operation in the debug mode to the particular peripheral component or the DMA to the particular peripheral component irrespective of the lock status of the particular peripheral component.

6. The microcontroller device of claim 1, where the peripheral access controller is configured to:

receive an attempt to lock a locked peripheral component, or unlock an unlocked peripheral component; and in response to the attempt, generate an error condition without allowing the attempt.

7. The microcontroller device of claim 1, wherein allowing access to the particular peripheral component includes allowing write transfers to registers in the particular peripheral component, and wherein denying access to the particular peripheral component includes:

refusing write transfers to registers in the particular peripheral component, and terminating the request with an error.

8. The microcontroller device of claim 1, wherein the peripheral access controller is configured to:

conditioned on determining that the particular peripheral component is unlocked, drive an output signal coupled to the particular peripheral component to a first state; and conditioned on determining that the particular peripheral component is locked, drive the output signal coupled to the particular peripheral component to a second state.

9. The microcontroller device of claim 8, wherein the particular peripheral component includes one or more registers, each register coupled to a designated output signal of the peripheral access controller such that each register is configured to be individually locked or unlocked by the peripheral access controller.

10. The microcontroller device of claim 8, wherein the particular peripheral component includes one or more registers and the data associated with the particular peripheral component includes one or more bits corresponding to the one or more registers, wherein the peripheral access controller is configured to serially transfer the one or more bits to the particular peripheral component over a single output line, and wherein the particular peripheral component is configured to locally lock or unlock the one or more registers based on a value of a corresponding bit.

11. The microcontroller device of claim 8, wherein the first state corresponds to a low value of the output signal and the second state corresponds to a high value of the output signal.

12. The microcontroller device of claim 1, further comprising:

a processor;

a matrix that is configured to enable one or more master modules to be coupled to the one or more peripheral components using one or more slave buses; and a bus bridge that is configured to provide an interface between a high-speed bus domain serving the processor and the matrix and a low-power bus domain serving the peripheral access controller and the one or more peripheral components.

13. The microcontroller device of claim 12, wherein read and write transfers on the high-speed bus domain are converted into corresponding transfers on the low-power bus domain through a master interface, wherein the low-power bus domain is not pipelined, and wherein wait states are added during transfers to and from the low-power bus domain when the high-speed bus waits for access to the low-power bus domain.

14. The microcontroller device of claim 12, wherein the matrix is configured to enable parallel access to a plurality of shared peripheral components from a plurality of master modules.

15. The microcontroller device of claim 12, wherein the peripheral components include one or more of a watch dog timer module, a timer module, or a port module, and wherein the low-power bus domain is compliant with AMBA Advanced Peripheral Bus (APB) protocol.

16. A method comprising:

receiving, at a peripheral access controller in a microcontroller device, a request to access a particular peripheral component of one or more peripheral components included in the microcontroller device, wherein the peripheral access controller is coupled to the one or more peripheral components and includes data that indicate lock statuses of the one or more peripheral components;

in response to the request, reading a value of the data associated with the particular peripheral component;

based on reading the value of the data associated with the particular peripheral component, determining a lock status of the particular peripheral component;

conditioned on determining that the particular peripheral component is unlocked, allowing access to the particular peripheral component; and conditioned on determining that the particular peripheral component is locked, denying access to the particular peripheral component.

17. The method of claim 16, wherein reading a value of the data associated with the particular peripheral component comprises reading a value of a bit in a register included peripheral access controller, wherein each bit in the register corresponds to a different peripheral component and indicates a lock status of the corresponding peripheral component.

18. The method of claim 16, further comprising:

receiving a request for at least one of a write operation in a debug mode to the particular peripheral component, or direct memory access (DMA) to the particular peripheral component; and in response to the request, allowing the write operation in the debug mode to the particular peripheral component or the DMA to the particular peripheral component irrespective of the lock status of the particular peripheral component.

19. The method of claim 16, further comprising:

receiving an attempt to lock a locked peripheral component, or unlock an unlocked peripheral component; and in response to the attempt, generating an error condition without allowing the attempt.

20. The method of claim 16, wherein allowing access to the particular peripheral component includes allowing write transfers to registers in the particular peripheral component, and wherein denying access to the particular peripheral component includes:

refusing write transfers to registers in the particular peripheral component, and terminating the request with an error.

21. The method of claim 16, further comprising:

conditioned on determining that the particular peripheral component is unlocked, driving an output signal coupled to the particular peripheral component to a first state; and conditioned on determining that the particular peripheral component is locked, driving the output signal coupled to the particular peripheral component to a second state.

22. The method of claim 21, wherein the particular peripheral component includes one or more registers, each register coupled to a corresponding output signal of the peripheral access controller, the method further comprising:

locking or unlocking each register individually by the peripheral access controller based on the corresponding output signal.

23. The microcontroller device of claim 21, wherein the particular peripheral component includes one or more registers and the data associated with the particular peripheral component includes one or more bits corresponding to the one or more registers, the method further comprising:

serially transferring the one or more bits to the particular peripheral component over a single output line: and locally locking or unlocking, by the particular peripheral component, the one or more registers based on a value of a corresponding bit.

24. The method of claim 21, wherein the first state corresponds to a low value of the output signal and the second state corresponds to a high value of the output signal.

\* \* \* \* \*